(12) United States Patent
Cornejo Barriere et al.

(10) Patent No.: US 12,026,664 B2
(45) Date of Patent: Jul. 2, 2024

(54) AUTOMATICALLY GENERATING INVENTORY-RELATED INFORMATION FORECASTS USING MACHINE LEARNING TECHNIQUES

(71) Applicant: Dell Products L.P., Round Rock, TX (US)

(72) Inventors: Mario Alberto Cornejo Barriere, Round Rock, TX (US); Babak Farmanesh, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 279 days.

(21) Appl. No.: 17/502,199

(22) Filed: Oct. 15, 2021

(65) Prior Publication Data
US 2023/0122754 A1    Apr. 20, 2023

(51) Int. Cl.
*G06Q 10/087* (2023.01)
*G06F 17/18* (2006.01)
*G06N 5/022* (2023.01)

(52) U.S. Cl.
CPC .......... *G06Q 10/087* (2013.01); *G06F 17/18* (2013.01); *G06N 5/022* (2013.01)

(58) Field of Classification Search
CPC ...... G06Q 10/087; G06Q 10/04; G06F 17/18; G06N 5/022; G06N 20/20

(Continued)

(56) References Cited

U.S. PATENT DOCUMENTS 10,706,386 B2   7/2020  Trivelpiece et al.
11,004,034 B2   5/2021  Ward et al.
(Continued)

OTHER PUBLICATIONS

Aldhaheri, Mai. Sustainable Inventory Management Model for High-Volume Material with Limited Storage Space Under Stochastic Demand and Supply. University of Exeter (United Kingdom) ProQuest Dissertations Publishing, 2019. (Year: 2019).*

(Continued)

*Primary Examiner* — Florian M Zeender
*Assistant Examiner* — Fawaad Haider
(74) *Attorney, Agent, or Firm* — Ryan, Mason & Lewis, LLP (57) ABSTRACT

Methods, apparatus, and processor-readable storage media for automatically generating inventory-related information forecasts using machine learning techniques are provided herein. An example computer-implemented method includes training a machine learning model for calculating weights for multiple statistical forecasts for inventory-related data by processing historical data pertaining to at least a portion of the multiple statistical forecasts; generating two or more statistical forecasts for inventory-related data associated with an enterprise by processing data pertaining to multiple system parts across multiple geographic granularities associated with the enterprise; calculating weights for the generated statistical forecasts by processing data associated with at least a portion of the generated statistical forecasts using the trained machine learning model; generating at least one composite inventory-related forecast by combining the generated statistical forecasts in accordance with the calculated weights; and performing automated actions based on the at least one composite inventory-related forecast.

20 Claims, 6 Drawing Sheets

(58) Field of Classification Search
USPC .......................................................... 705/28
See application file for complete search history.

(56) References Cited

U.S. PATENT DOCUMENTS

| | | | | |
|---|---|---|---|---|
| 2016/0328661 | A1* | 11/2016 | Reese ..................... | G06N 3/044 |
| 2021/0125073 | A1* | 4/2021 | Keng ..................... | G06N 3/044 |
| 2021/0326913 | A1* | 10/2021 | Novak ............... | G06Q 30/0631 |
| 2021/0365876 | A1* | 11/2021 | Breese ..................... | G07F 9/026 |
| 2022/0358451 | A1* | 11/2022 | Huang ................. | G06Q 10/087 |
| 2023/0045901 | A1* | 2/2023 | Holm ................. | G06Q 30/0204 |

OTHER PUBLICATIONS

Narkhede, S., Towards Data Science, Understanding AUC-ROC Curve, https://towardsdatascience.com/understanding-auc-roc-curve-68b2303cc9c5, Jun. 2018.

* cited by examiner

AUTOMATICALLY GENERATING INVENTORY-RELATED INFORMATION FORECASTS USING MACHINE LEARNING TECHNIQUES

FIELD

The field relates generally to information processing systems, and more particularly to techniques for inventory management using such systems.

BACKGROUND

Enterprise service parts organizations routinely plan for parts that may need to be replaced if one or more systems fail. Additionally, for example, if a customer has purchased a particular type of warranty (e.g., a same-business-day warranty), an enterprise service parts organization is committed to getting the replacement part(s) to the customer within a limited number of hours. Accordingly, maintaining sufficient amounts of system parts in particular inventory locations is an important challenge.

Conventional inventory management approaches commonly include using the same forecast across multiple locations, which typically leads to overprovisioning of system parts and increased costs corresponding thereto. Additionally, with respect to conventional inventory management approaches, forecast accuracy is often low due to the inability to deal with issues such as sporadic demand, limited and/or lack of demand history for given system parts at given locations, and undocumented system movement from one geographic area to another geographic area.

SUMMARY

Illustrative embodiments of the disclosure provide techniques for automatically generating inventory-related information forecasts using machine learning techniques. An exemplary computer-implemented method includes training at least one machine learning model for calculating weights for multiple statistical forecasts for inventory-related data by processing historical data pertaining to at least a portion of the multiple statistical forecasts. The method also includes generating two or more statistical forecasts for inventory-related data associated with at least one enterprise by processing data pertaining to multiple system parts across multiple geographic granularities associated with the at least one enterprise, and calculating weights for the two or more generated statistical forecasts for the inventory-related data associated with the at least one enterprise by processing data associated with at least a portion of the two or more generated statistical forecasts using the at least one trained machine learning model. Additionally, the method includes generating at least one composite inventory-related forecast for the at least one enterprise by combining the two or more generated statistical forecasts in accordance with the calculated weights, and performing one or more automated actions based at least in part on the at least one composite inventory-related forecast.

Illustrative embodiments can provide significant advantages relative to conventional inventory management approaches. For example, problems associated with low-accuracy forecasts and overprovisioning of system parts are overcome in one or more embodiments through generating inventory-related information forecasts using machine learning techniques to process system part data at multiple geographic granularities associated with an enterprise.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
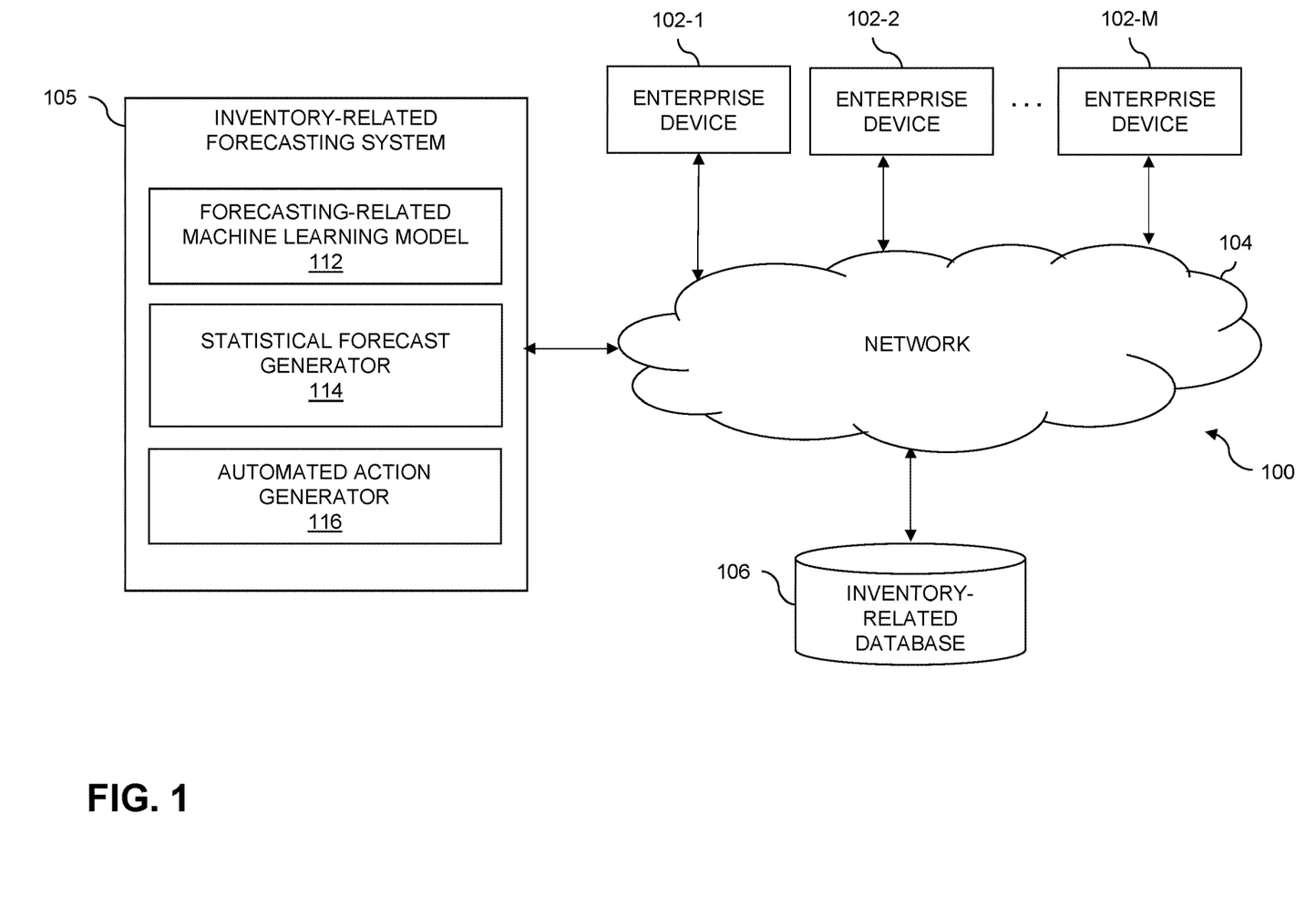
FIG. 1 shows an information processing system configured for automatically generating inventory-related information forecasts using machine learning techniques in an illustrative embodiment.

FIG. 1 shows a computer network (also referred to herein as an information processing system) 100 configured in accordance with an illustrative embodiment. The computer network 100 comprises a plurality of enterprise devices 102-1, 102-2, . . . 102-M, collectively referred to herein as enterprise devices 102. The enterprise devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is inventory-related forecasting system 105.

The enterprise devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The enterprise devices 102 in some embodiments comprise respective computers associated with a particular company, organization, group of users (such as, for example, warehouse-related users and/or inventory-related users), or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, inventory-related forecasting system 105 can have an associated inventory-related database 106 configured to store data pertaining to system parts and inventory and/or warehouse-related information, which comprise, for example, part demand history, regional inventory and/or warehouse-related data, local inventory and/or warehouse-related data, statistical forecast data, etc.

The inventory-related database 106 in the present embodiment is implemented using one or more storage systems associated with inventory-related forecasting system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with inventory-related forecasting system 105 are one or more input-output devices, which illustratively comprise keyboards, displays or other types of input-output devices in any combination. Such input-output devices can be used, for example, to support one or more user interfaces to inventory-related forecasting system 105, as well as to support communication between inventory-related forecasting system 105 and other related systems and devices not explicitly shown.

Additionally, inventory-related forecasting system 105 in the FIG. 1 embodiment is assumed to be implemented using at least one processing device. Each such processing device generally comprises at least one processor and an associated memory, and implements one or more functional modules for controlling certain features of inventory-related forecasting system 105.

More particularly, inventory-related forecasting system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows inventory-related forecasting system 105 to communicate over the network 104 with the enterprise devices 102, and illustratively comprises one or more conventional transceivers.

The inventory-related forecasting system 105 further comprises forecasting-related machine learning model 112, statistical forecast generator 114, and automated action generator 116.

It is to be appreciated that this particular arrangement of elements 112, 114 and 116 illustrated in the inventory-related forecasting system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically classifying and regressing inventory-related information for machine learning-based forecasting techniques involving enterprise devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, inventory-related forecasting system 105 and inventory-related database 106 can be on and/or part of the same processing platform.

An exemplary process utilizing elements 112, 114 and 116 of an example inventory-related forecasting system 105 in computer network 100 will be described in more detail with reference to the flow diagram of FIG. 4.

Accordingly, at least one embodiment includes classifying and regressing regional and local information for intermittent inventory-related forecasts. As further detailed herein, such an embodiment includes providing improved forecast accuracy (e.g., over conventional approaches) while reducing inventory-level recommendations. One or more embodiments include processing multiple forecast data streams, transforming a forecast to a classification problem, and using at least one receiver operating characteristic (ROC) curve to calculate weights assigned to each forecast data stream in connection with combining the forecast data streams into a composite forecast. By way of illustration, in one or more embodiments, the x-axis of an ROC curve represents the false positive rate and the y-axis of the ROC curve represents the true positive rate.

In at least one embodiment, multiple components of regional and local warehouse information are used as attributes in generating a system parts forecast. For example, such an embodiment includes considering and/or processing part information (j) (which can include, for example, kit component information) and location information (i) in connection with demand history ($py_{ij}$) and install base information ($pb_{ij}$). Additionally, such an embodiment includes considering and/or processing target information pertaining to target locations (m) and target parts (n), forecasted locally, as well as regional input information pertaining to locations (M) and parts (N), wherein the region encompasses one or more local areas and/or locations. As an example, a given region can include all inventory warehouses from the United States and Brazil, and as part of the input, a machine learning-based model processes information from the region, which will include the demand of both countries together. In such an example, local information can include the specific demand at a given warehouse within the above-noted region. In at least one embodiment, region boundaries can be based at least in part on how business is geographically managed (e.g., the Americas, Europe, the Middle East and Africa (EMEA), Asia-Pacific and Japan (APJ), etc.). Additionally, in such an embodiment, the location(s) and/or area(s) which constitute a "local" designation can be defined, for example, by each independent enterprise, location and/or warehouse.

As further detailed herein, one or more embodiments include generating statistical forecasts (SFs) using a machine learning-based model, wherein each denoted SF can be generated based at least in part on one or more given parameters or variables, as further detailed herein. In such an embodiment, the machine learning-based model processes demand history of each part-location combination. For example, the machine learning-based model can process T periods of demand for each part (i) at location (j) as follows: $SF_{ij} = TS(py_{ij1}, \ldots, py_{ijT})$, wherein "TS" represents "time series." Additionally or alternatively, one or more embodiments can include using a weighted average of the past T time periods as follows:

$$SF_{ij} = \frac{\sum_{t=1:T} py_{ijt}}{T}$$

As also described herein, at least one embodiment includes generating at least one statistical forecast based on install base share. As used herein, install base refers to system parts and/or portions thereof that belong to a service tag that needs to be planned in the given network (e.g., a system part under warranty). In one or more embodiments, such a statistical forecast is generated and/or utilized at least in part to give a sense of how important the location is based on the total statistical forecast being generated. Additionally, such a statistical forecast can be spread based on the install base population being supported at each location (j) for each part (i). As such, the locations that have the largest install base will receive a larger share of the forecast.

In connection with generating a statistical forecast based on install base share (wherein "IF" represents "install base forecast"), one or more embodiments can include using the following equation, wherein the first term of the right-hand side (i.e., $$\frac{IB_{ij}}{\sum_{k=1:(m \text{ or } M)} IB_{ij}}$$

represents the install base share, and the second term of the right-hand side (i.e., $\Sigma_{i=1:(m \text{ or } M)} SF_{ij}$) represents the total statistical forecast generated at that location across all parts:

$$IF_{ij} = \frac{IB_{ij}}{\sum_{k=1:(m \text{ or } M)} IB_{ij}} * \sum_{i=1:(m \text{ or } M)} SF_{ij}$$

Also, at least one embodiment includes generating at least one statistical forecast based on location share (wherein "LF" represents "demand location forecast"). With such a statistical forecast, the importance of the location is highlighted, but in this instance the spread is based on the forecast share compared to the rest of the inventory warehouses. In connection with generating a statistical forecast based on location share, one or more embodiments can include using the following equation, wherein the first term on the right-hand side (i.e., $$\frac{\sum_{j=1:n} SF_{ij}}{\sum_{j=1:n} \sum_{k=1:(m \text{ or } M)} SF_{ij}}$$

represents the forecast share for each location (j) based on the overall forecast generated across all parts (i) and all locations (j), and the second term on the right-hand side (i.e., $\Sigma_{i=1:(m \text{ or } M)} SF_{ij}$) represents the statistical forecast generated at that location across all parts:

$$LF_{ij} = \frac{\sum_{j=1:n} SF_{ij}}{\sum_{j=1:n} \sum_{k=1:(m \text{ or } M)} SF_{ij}} * \sum_{i=1:(m \text{ or } M)} SF_{ij}$$

Further, as described herein, at least one embodiment includes generating at least one statistical forecast based on demand at different levels and different regions. Given that demand can occur at at least two different levels (e.g., at the part level and at the kit level), as one or more system parts are components of a kit, it is possible that in some regions (e.g., countries) the demand is only determined at the kit level, while in other regions the demand is only determined at the part level. For at least this reason, and in order to normalize the relevant data, one or more embodiments include generating two different forecasts for at least a portion of the methods detailed herein: one forecast at the part level, and one forecast at the kit level. Additionally or alternatively, given that the demand can be sporadic, and in order to learn what is happening at other locations without deemphasizing local information, at least one embodiment includes generating forecasts at at least one region level and at at least one local level.

Also, in light of the above descriptions, one or more embodiments include combining generated statistical forecasts (wherein "CF" represents "composite forecast"). In other words, as a result of the different levels and geographic information, one or more embodiments can include dealing with multiple different forecasting streams such as the following: statistical forecast method ($SF_{ij}$), and statistical forecast based on install base share ($IF_{ij}$) on the bases of regional kit, regional part, local kit, and local part, and statistical forecast based on location share ($LF_{ij}$) on the bases of regional kit, regional part, local kit, and local part. Additionally, in at least one embodiment, a weight is assigned to each forecast method in order to provide more relevance to the ultimate forecast, such as follows: $CF_{ij}=\Sigma_k w^k F_{ij}^k$. In such an equation, "k" represents the different forecasting methods that were calculated. For example, an example version of such an equation could include $F_{ij}^1$, wherein k=1 is the statistical forecast.

Relatedly, one or more embodiments includes implementing at least one weight optimization technique. As detailed herein, the machine learning-based model disclosed herein is generated within the context of a classification problem. For example, in such an embodiment, if there is demand for a part in the next eight weeks, the corresponding weight gets a value of 1, and 0 otherwise, as denoted as follows:

$$y_{ij} = \begin{cases} 1 & \text{at least 1 demand for pair } (i, j) \text{ in next 8 weeks} \\ 0 & \text{else} \end{cases}$$

The classification problem in question can be, in one or more embodiments, an unbalanced classification problem wherein, for example, overall, 1% of the labels are 1.

Additionally, at least one embodiment can include using an ROC curve in connection with optimizing the weights. Additionally, as further detailed herein in connection with one or more embodiments, area under an ROC curve is a performance measurement for classification problems at various threshold settings. ROC is a probability curve and the area under the curve (AUC) represents the degree or measure of separability which indicates how much the model is capable of distinguishing between classes. For example, in at least one embodiment, the higher the AUC value, the better the model is at predicting "0" classes as 0 and predicting and "1" classes as 1. For example, in such an embodiment, the area under the ROC is selected for measuring accuracy. In order to calculate the ideal weights for each forecasting methodology, the area under ROC is optimized using at least one stochastic gradient descent technique, such as follows:

$$\max_w \int ROC(Y, CF),$$

such that $$\|w\|_1 = \sum_k |w^k| = 1,$$

wherein Y is vector of all $y_{ij}$, CF is vector of all $CF_{ij}$, and w is vector of all $w^k$. Subsequently, in one or more embodiments, the Lagrangian is taken to make the problem unconstrained, as follows:

$$\max_w \int ROC(Y, CF) - \lambda |\|w\|_1 - 1|,$$

wherein λ can include a large number that penalizes the optimization if $$\|w\|_1$$

deviates from 1. Accordingly, the original optimization model had a constraint to be satisfied, represented as $$\|w\|_1 = \sum_k |w^k| = 1 \Big),$$

and when taking the Lagrangian, the constraint $$\Big(\text{i.e., } \|w\|_1 = \sum_k |w^k| = 1\Big)$$

is removed (meaning that the problem is now unconstrained).

Also, it is to be appreciated that the machine learning-based model described herein in connection with one or more embodiments is able to digest more (or less) attributes than detailed in the illustrative examples above.

Figure 2:
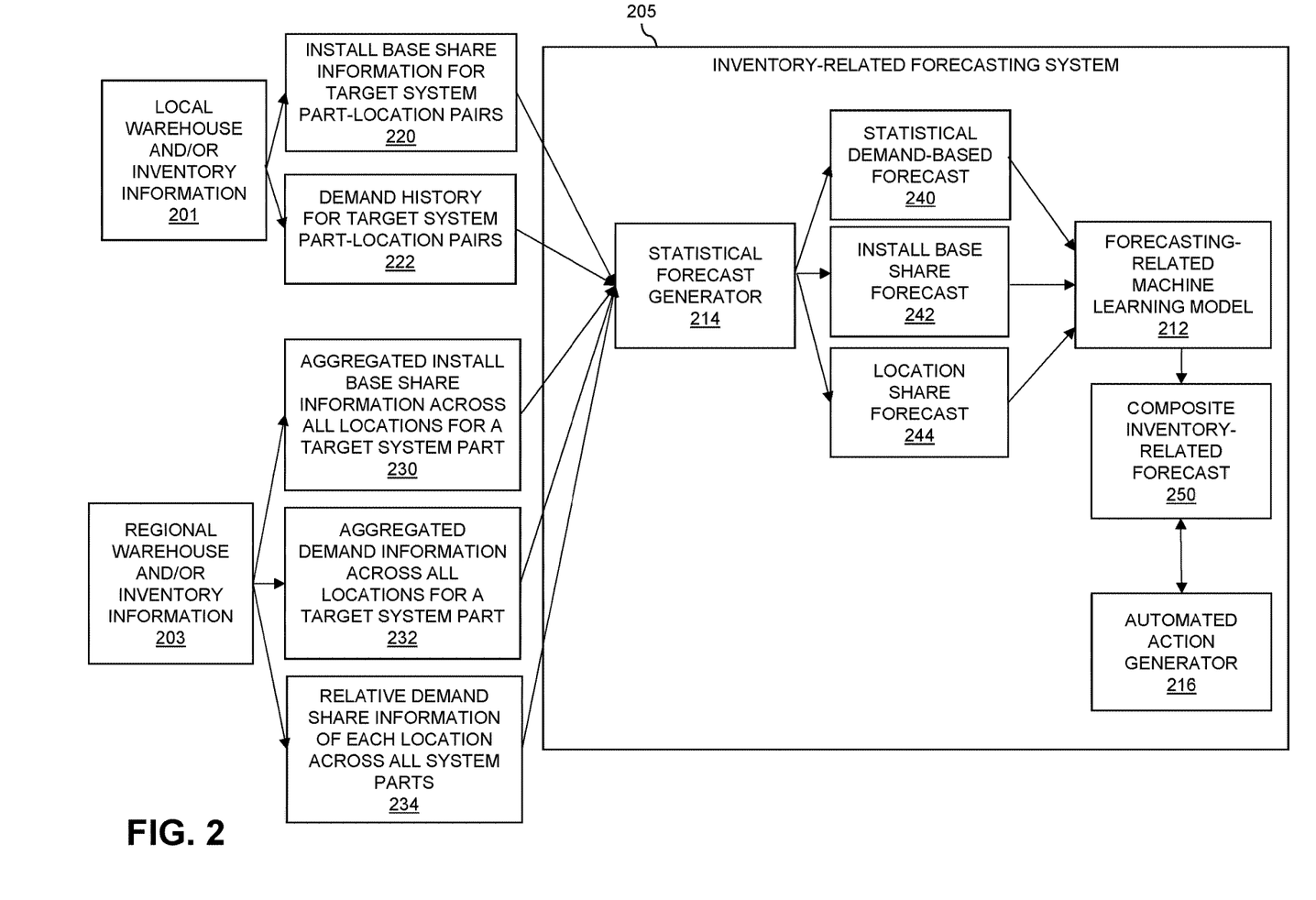
FIG. 2 shows an overall process flow of a machine learning-based forecasting model with multiple forecasting streams in an illustrative embodiment.

FIG. 2 shows an overall process flow of a machine learning-based forecasting model with multiple forecasting streams in an illustrative embodiment. By way of illustration, FIG. 2 depicts local warehouse and/or inventory information 201, regional warehouse and/or inventory information 203, and inventory-related forecasting system 205. The local warehouse and/or inventory information 201 is processed to generate install base share information for target system part-location pairs 220 and demand history for target system part-location pairs 222. The regional warehouse and/or inventory information 203 is processed to generate aggregated install base share information across all locations for a target system part 230, aggregated demand information across all locations for a target system part 232, and relative demand share information of each location across all system parts 234 (that is, the sum of the demand of all parts at a given location divided by the sum of demand of all parts at all locations).

As also depicted in FIG. 2, outputs 220, 222, 230, 232, and 234 are provided to and/or processed by statistical forecast generator 214, which generates a statistical demand-based forecast 240, an install base share forecast 242, and a location share forecast 244. In at least one embodiment, the calculation from component 234 is multiplied by the statistical forecast generated via component 214, and a new forecast is generated this way. Such individual forecasts (i.e., forecasts 240, 242 and 244) are provided to and/or processed by forecasting-related machine learning model 212, which trains optimal weights by optimizing the area under at least ROC curve using stochastic gradient descent techniques, and using such weights and combining the output individual forecasts 240, 242 and 244, generates composite inventory-related forecast 250. Additionally, the composite inventory-related forecast 250 is used by automated action generator 216 to perform one or more automated actions (as further detailed herein).

Figure 3:
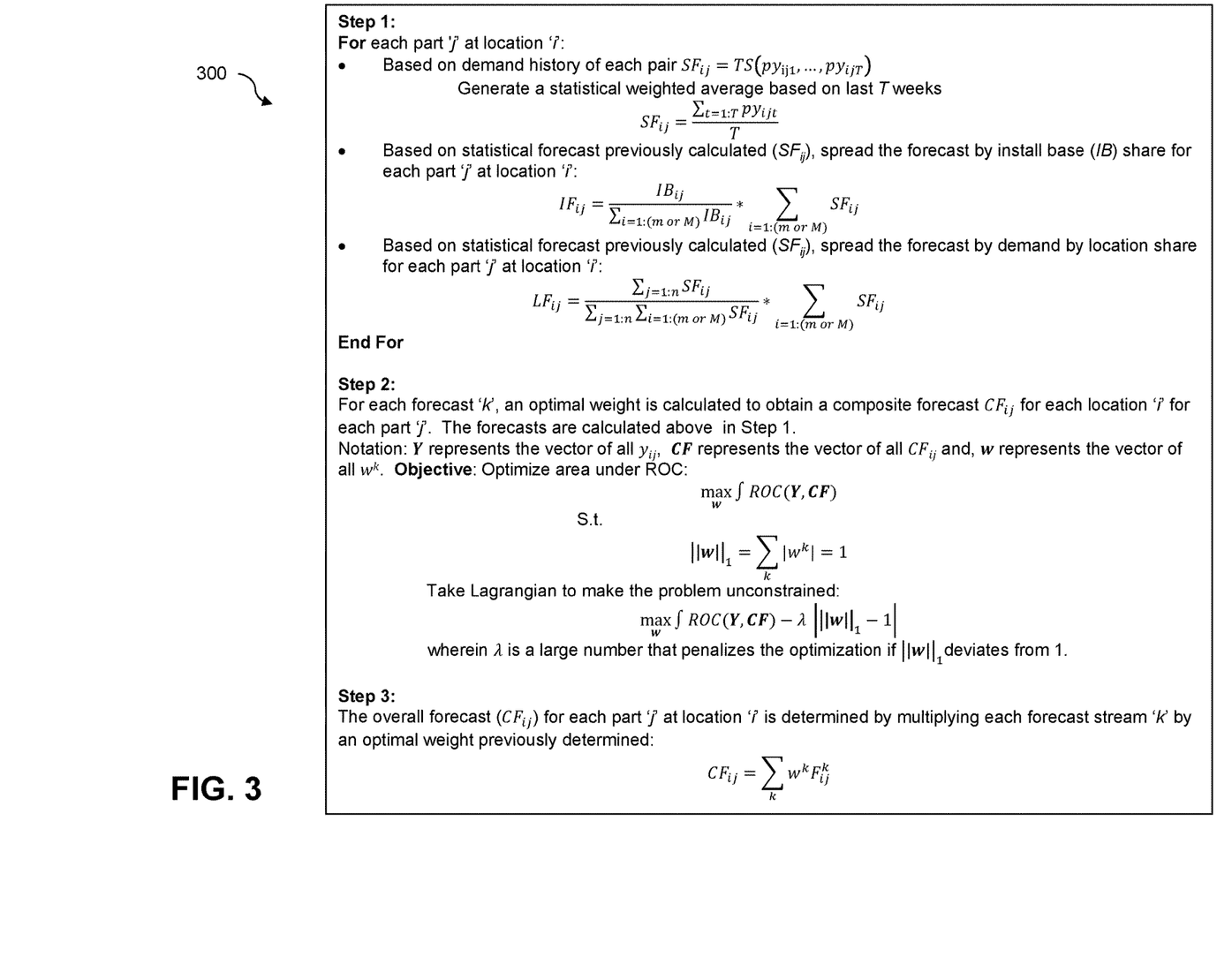
FIG. 3 shows example pseudocode for implementing at least a portion of a machine learning-based forecasting model in an illustrative embodiment.

FIG. 3 shows example pseudocode for implementing at least a portion of a machine learning-based forecasting model in an illustrative embodiment. In this embodiment, example pseudocode 300 can be executed by or under the control of at least one processing system and/or device. For example, the example pseudocode 300 may be viewed as comprising a portion of a software implementation of at least part of inventory-related forecasting system 105 of the FIG. 1 embodiment.

The example pseudocode 300 illustrates generating a set of different forecasts in Step 1, calculating the optimal weight that is assigned to each forecast method in Step 2, and calculating a composite forecast in Step 3 (e.g., calculating the sum of the multiplication of each forecast by the weight(s) determined in Step 2). More specifically, Step 1 of example pseudocode 300 includes, for each part 'j' at location 'i', and based on demand history of each pair $SF_{ij}=TS(py_{ij1}, \ldots, py_{ijT})$, generating a statistical weighted average based on the last T weeks:

$$SF_{ij} = \frac{\sum_{k=1:T} py_{ijt}}{T}.$$

Additionally, Step 1 of example pseudocode 300 also includes, based on the statistical forecast ($SF_{ij}$), spreading the forecast by install base share for each part 'j' at location 'i':

$$IF_{ij} = \frac{IB_{ij}}{\sum_{k=1:(m \text{ or } M)} IB_{ij}} * \sum_{k=1:(m \text{ or } M)} SF_{ij}.$$

Further, Step 1 also includes, based on the statistical forecast ($SF_{ij}$), spreading the forecast by demand by location share for each part 'j' at location 'i':

$$LF_{ij} = \frac{\sum_{j=1:n} SF_{ij}}{\sum_{j=1:n} \sum_{k=1:(m \text{ or } M)} SF_{ij}} * \sum_{k=1:(m \text{ or } M)} SF_{ij}.$$

As also depicted in FIG. 3, Step 2 of example pseudocode 300 includes, for each forecast 'k' calculated in Step 1, calculating an optimal weight to obtain a composite forecast ($CF_{ij}$) for each location 'i' for each part 'j.' As also illustrated in FIG. 3, the notation "Y" represents the vector of all $y_{ij}$, the notation "CF" represents the vector of all $CF_{ij}$ and the notation "w" represents the vector of all $w^k$. Further, in example pseudocode 300, an objective of Step 2 is to optimize the area under $$ROC\left(\max_w \int ROC(Y, CF)\right)$$

such that $$\|w\|_1 = \sum_k |w^k| = 1.$$

Also, Step 2 of example pseudocode 300 further includes taking the Lagrangian to make the problem unconstrained:

$$\max_w \int ROC(Y, CF) - \lambda|\|w\|_1 - 1|,$$

wherein λ is a large number that penalizes the optimization if $$\|w\|_1$$

deviates from 1.

As also depicted in FIG. 3, Step 3 of example pseudocode 300 includes determining the overall composite forecast ($CF_{ij}$) for each part 'j' at location 'i' by multiplying each forecast stream 'k' by the optimal weight determined in Step 2: $CF_{ij}=\Sigma_k w_k F_{ij}^k$.

It is to be appreciated that this particular example code snippet shows just one example implementation of a portion of a machine learning-based forecasting model, and alternative implementations of the process can be used in other embodiments.

It is also to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 4:
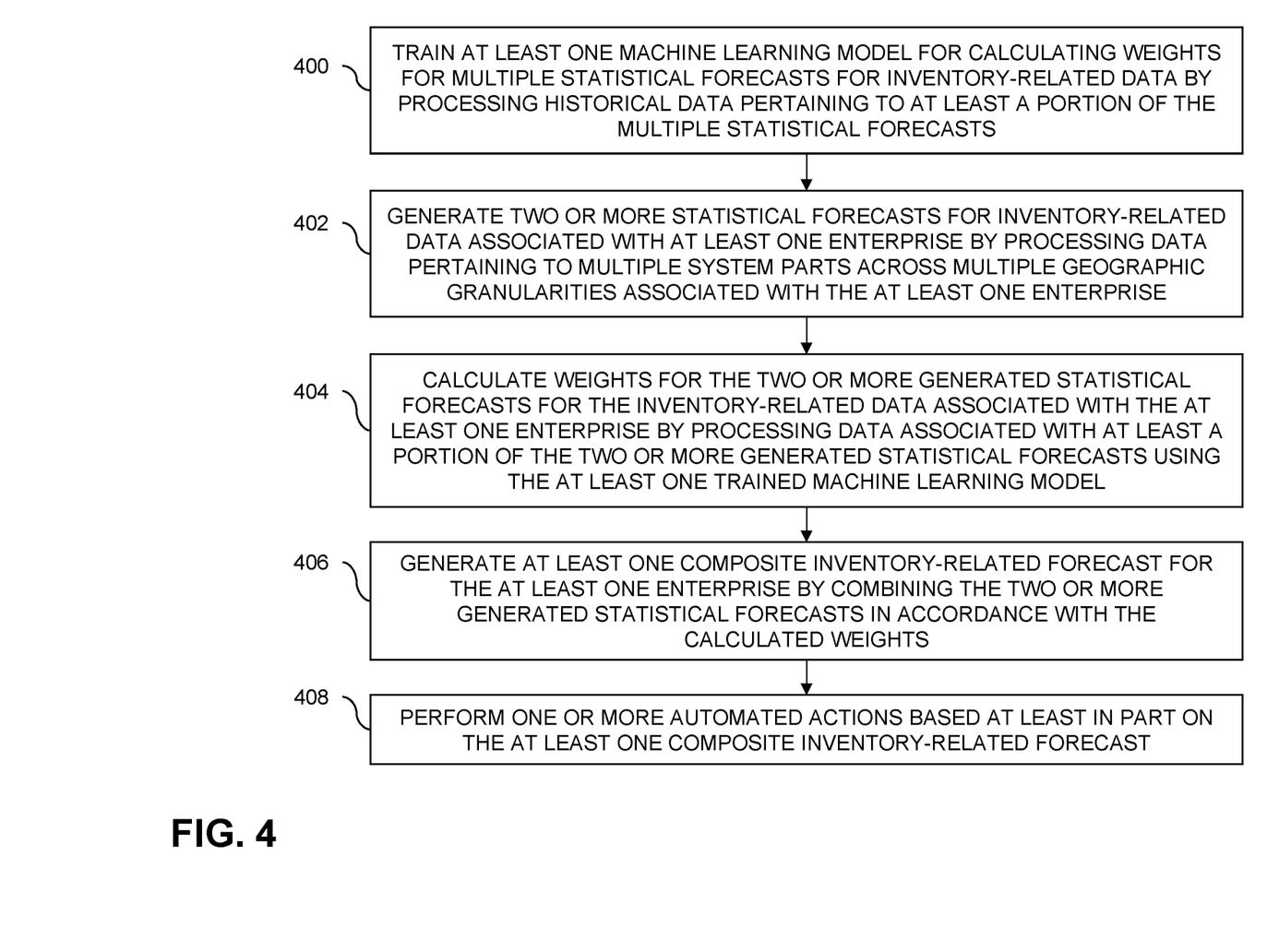
FIG. 4 is a flow diagram of a process for automatically generating inventory-related information forecasts using machine learning techniques in an illustrative embodiment.

FIG. 4 is a flow diagram of a process for automatically generating inventory-related information forecasts using machine learning techniques in an illustrative embodiment. It is to be understood that this particular process is only an example, and additional or alternative processes can be carried out in other embodiments.

In this embodiment, the process includes steps 400 through 408. These steps are assumed to be performed by the inventory-related forecasting system 105 utilizing its elements 112, 114 and 116.

Step 400 includes training at least one machine learning model for calculating weights for multiple statistical forecasts for inventory-related data by processing historical data pertaining to at least a portion of the multiple statistical forecasts (e.g., using at least one stochastic gradient descent technique). In one or more embodiments, training the at least one machine learning model includes generating at least one receiver operating characteristic curve and processing at least a portion of data points in at least one area under the at least one receiver operating characteristic curve using the at least one stochastic gradient descent technique. Additionally or alternatively, one or more embodiments include removing one or more constraints from the at least one machine learning model using at least one Lagrangian function.

Step 402 includes generating two or more statistical forecasts for inventory-related data associated with at least one enterprise by processing data pertaining to multiple system parts across multiple geographic granularities associated with the at least one enterprise. In at least one embodiment, processing data pertaining to multiple system parts across multiple geographic granularities includes processing data pertaining to demand history for one or more system part-geographic location combinations, processing data pertaining to install base share associated with at least a portion of the multiple system parts, processing data pertaining to location share associated with at least a portion of the multiple system parts, and/or processing data pertaining to demand at multiple system part-related levels and multiple geographic location-related levels.

Step 404 includes calculating weights for the two or more generated statistical forecasts for the inventory-related data associated with the at least one enterprise by processing data associated with at least a portion of the two or more generated statistical forecasts using the at least one trained machine learning model. Step 406 includes generating at least one composite inventory-related forecast for the at least one enterprise by combining the two or more generated statistical forecasts in accordance with the calculated weights.

Step 408 includes performing one or more automated actions based at least in part on the at least one composite inventory-related forecast. In at least one embodiment, performing the one or more automated actions includes automatically retraining the at least one machine learning model based at least in part on the at least one composite inventory-related forecast. Additionally or alternatively, performing the one or more automated actions can include provisioning one or more of the multiple system parts to one or more geographic locations associated with the at least one enterprise and/or generating and outputting one or more inventory-related recommendations to one or more users associated with the at least one enterprise.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically classify and regress regional and local inventory-related information in connection with machine learning-based forecasting techniques. These and other embodiments can effectively decrease stocking level recommendations and reduce replenishment orders to a given network.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
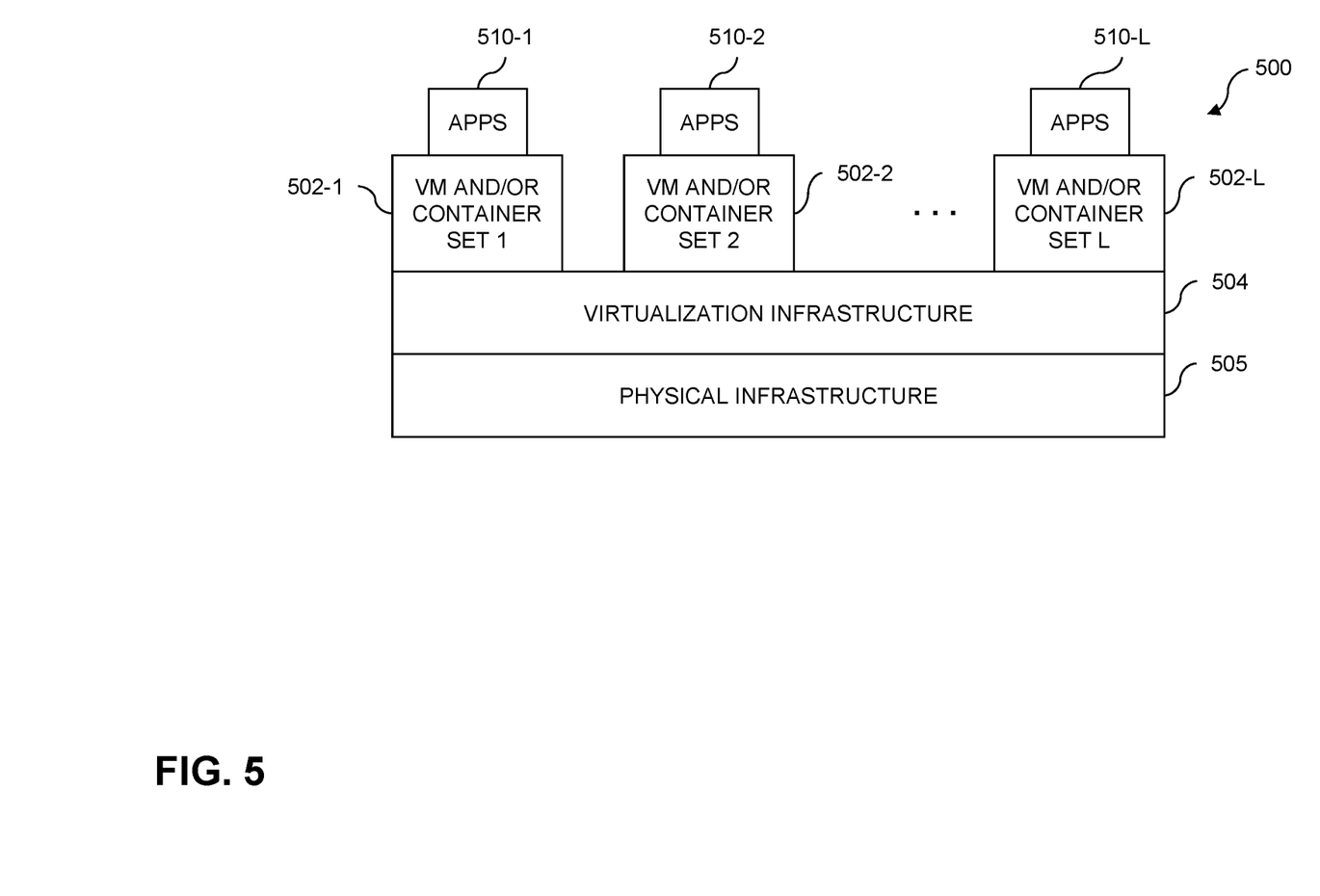
FIGS. 5 and 6 show examples of processing platforms that may be utilized to implement at least a portion of an information processing system in illustrative embodiments.
Figure 6:
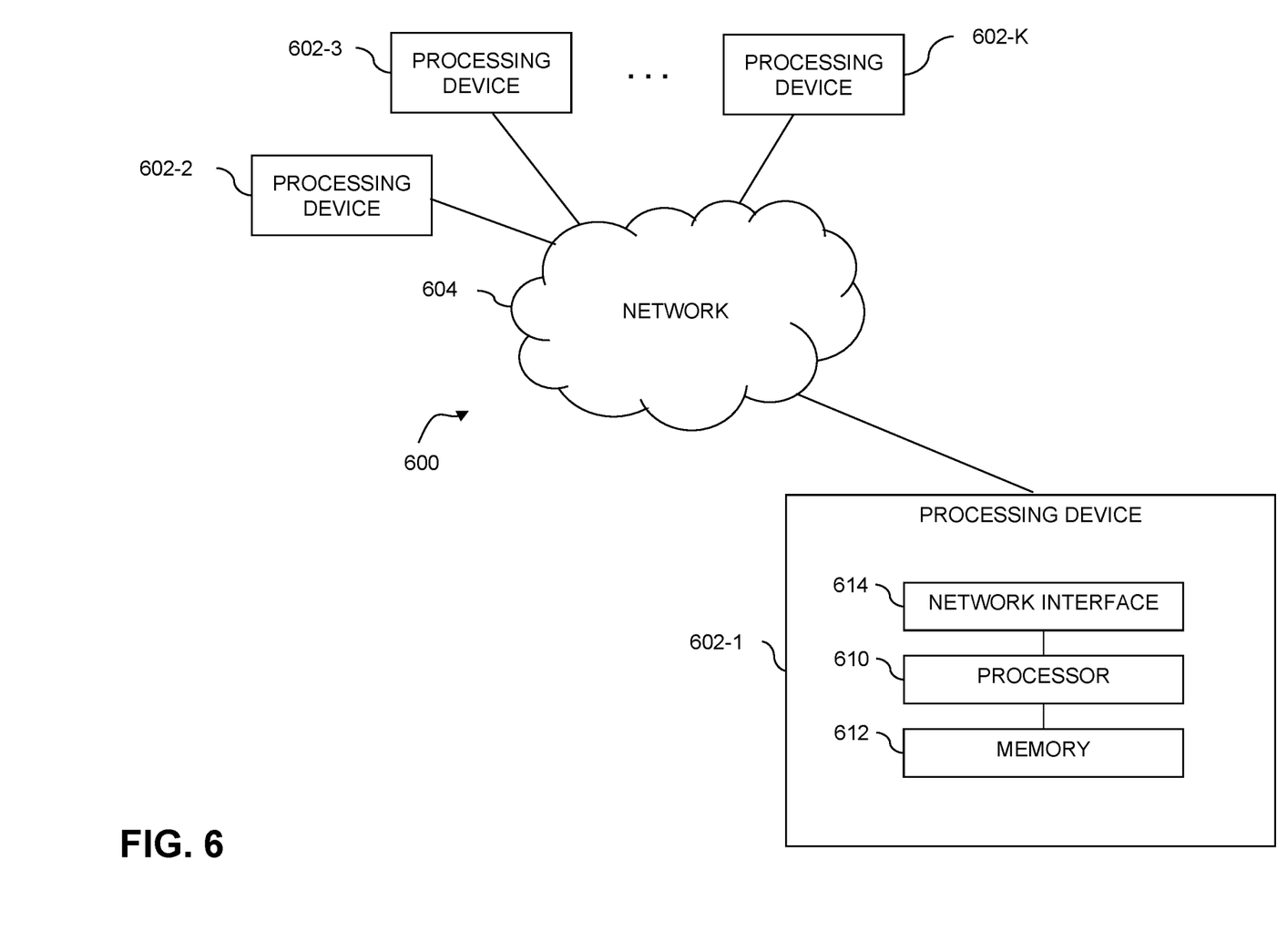

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   training at least one machine learning model for calculating weights for multiple statistical forecasts for inventory-related data by processing historical data pertaining to at least a portion of the multiple statistical forecasts;
   generating two or more statistical forecasts for inventory-related data associated with at least one enterprise by processing data pertaining to multiple system parts across multiple geographic locations associated with the at least one enterprise, wherein processing data pertaining to multiple system parts across multiple geographic locations comprises processing one or more of data pertaining to demand history for one or more of the multiple system parts across one or more of the multiple geographic locations, and processing data pertaining to one or more of the multiple system parts associated with at least one predefined enterprise service identifier;

calculating weights for the two or more generated statistical forecasts, based at least in part on accuracy of at least one forecasting methodology associated with the two or more generated statistical forecasts, for the inventory-related data associated with the at least one enterprise by processing data associated with at least a portion of the two or more generated statistical forecasts using the at least one machine learning model;

generating at least one composite inventory-related forecast for the at least one enterprise by combining the two or more generated statistical forecasts in accordance with the calculated weights; and performing one or more automated actions based at least in part on the at least one composite inventory-related forecast, wherein performing the one or more automated actions comprises:

generating and outputting one or more inventory-related recommendations, based at least in part on the at least one composite inventory-related forecast, to one or more users associated with the at least one enterprise;

automatically retraining at least a portion of the at least one machine learning model based at least in part on the at least one composite inventory-related forecast; and automatically initiating provisioning of one or more of the multiple system parts, in amounts related to the at least one composite inventory-related forecast, to one or more of the multiple geographic locations associated with the at least one enterprise;

wherein the method is performed by at least one processing device comprising a processor coupled to a memory.

2. The computer-implemented method of claim 1, wherein processing data pertaining to multiple system parts across multiple geographic locations comprises processing data pertaining to location share associated with at least a portion of the multiple system parts.

3. The computer-implemented method of claim 1, wherein processing data pertaining to multiple system parts across multiple geographic locations comprises processing data pertaining to demand at multiple system part-related levels and multiple geographic location-related levels.

4. The computer-implemented method of claim 1, wherein training the at least one machine learning model comprises processing the historical data pertaining to at least a portion of the multiple statistical forecasts using at least one stochastic gradient descent technique.

5. The computer-implemented method of claim 4, wherein training the at least one machine learning model comprises:

generating at least one receiver operating characteristic curve.

6. The computer-implemented method of claim 5, wherein training the at least one machine learning model further comprises:

processing at least a portion of data points in at least one area under the at least one receiver operating characteristic curve using the at least one stochastic gradient descent technique.

7. The computer-implemented method of claim 1, further comprising:

removing one or more constraints from the at least one machine learning model using at least one Lagrangian function.

8. A non-transitory processor-readable storage medium having stored therein program code of one or more software programs, wherein the program code when executed by at least one processing device causes the at least one processing device:

to train at least one machine learning model for calculating weights for multiple statistical forecasts for inventory-related data by processing historical data pertaining to at least a portion of the multiple statistical forecasts;

to generate two or more statistical forecasts for inventory-related data associated with at least one enterprise by processing data pertaining to multiple system parts across multiple geographic locations associated with the at least one enterprise, wherein processing data pertaining to multiple system parts across multiple geographic locations comprises processing one or more of data pertaining to demand history for one or more of the multiple system parts across one or more of the multiple geographic locations, and processing data pertaining to one or more of the multiple system parts associated with at least one predefined enterprise service identifier;

to calculate weights for the two or more generated statistical forecasts, based at least in part on accuracy of at least one forecasting methodology associated with the two or more generated statistical forecasts, for the inventory-related data associated with the at least one enterprise by processing data associated with at least a portion of the two or more generated statistical forecasts using the at least one machine learning model;

to generate at least one composite inventory-related forecast for the at least one enterprise by combining the two or more generated statistical forecasts in accordance with the calculated weights; and to perform one or more automated actions based at least in part on the at least one composite inventory-related forecast, wherein performing the one or more automated actions comprises:

generating and outputting one or more inventory-related recommendations, based at least in part on the at least one composite inventory-related forecast, to one or more users associated with the at least one enterprise;

automatically retraining at least a portion of the at least one machine learning model based at least in part on the at least one composite inventory-related forecast; and automatically initiating provisioning of one or more of the multiple system parts, in amounts related to the at least one composite inventory-related forecast, to one or more of the multiple geographic locations associated with the at least one enterprise.

9. The non-transitory processor-readable storage medium of claim 8, wherein processing data pertaining to multiple system parts across multiple geographic locations comprises processing data pertaining to location share associated with at least a portion of the multiple system parts.

10. The non-transitory processor-readable storage medium of claim 8, wherein training the at least one machine learning model comprises processing the historical data pertaining to at least a portion of the multiple statistical forecasts using at least one stochastic gradient descent technique.

11. The non-transitory processor-readable storage medium of claim 10, wherein training the at least one machine learning model comprises:
generating at least one receiver operating characteristic curve.

12. The non-transitory processor-readable storage medium of claim 11, wherein training the at least one machine learning model further comprises:
processing at least a portion of data points in at least one area under the at least one receiver operating characteristic curve using the at least one stochastic gradient descent technique.

13. The non-transitory processor-readable storage medium of claim 8, wherein the program code when executed by the at least one processing device further causes the at least one processing device:
to remove one or more constraints from the at least one machine learning model using at least one Lagrangian function.

14. An apparatus comprising:
at least one processing device comprising a processor coupled to a memory;
the at least one processing device being configured:
to train at least one machine learning model for calculating weights for multiple statistical forecasts for inventory-related data by processing historical data pertaining to at least a portion of the multiple statistical forecasts;
to generate two or more statistical forecasts for inventory-related data associated with at least one enterprise by processing data pertaining to multiple system parts across multiple geographic locations associated with the at least one enterprise, wherein processing data pertaining to multiple system parts across multiple geographic locations comprises processing one or more of data pertaining to demand history for one or more of the multiple system parts across one or more of the multiple geographic locations, and processing data pertaining to one or more of the multiple system parts associated with at least one predefined enterprise service identifier;
to calculate weights for the two or more generated statistical forecasts, based at least in part on accuracy of at least one forecasting methodology associated with the two or more generated statistical forecasts, for the inventory-related data associated with the at least one enterprise by processing data associated with at least a portion of the two or more generated statistical forecasts using the at least one machine learning model;
to generate at least one composite inventory-related forecast for the at least one enterprise by combining the two or more generated statistical forecasts in accordance with the calculated weights; and
to perform one or more automated actions based at least in part on the at least one composite inventory-related forecast, wherein performing the one or more automated actions comprises:
generating and outputting one or more inventory-related recommendations, based at least in part on the at least one composite inventory-related forecast, to one or more users associated with the at least one enterprise;
automatically retraining at least a portion of the at least one machine learning model based at least in part on the at least one composite inventory-related forecast; and
automatically initiating provisioning of one or more of the multiple system parts, in amounts related to the at least one composite inventory-related forecast, to one or more of the multiple geographic locations associated with the at least one enterprise.

15. The apparatus of claim 14, wherein processing data pertaining to multiple system parts across multiple geographic locations comprises processing data pertaining to location share associated with at least a portion of the multiple system parts.

16. The apparatus of claim 14, wherein processing data pertaining to multiple system parts across multiple geographic locations comprises processing data pertaining to demand at multiple system part-related levels and multiple geographic location-related levels.

17. The apparatus of claim 14, wherein training the at least one machine learning model comprises processing the historical data pertaining to at least a portion of the multiple statistical forecasts using at least one stochastic gradient descent technique.

18. The apparatus of claim 17, wherein training the at least one machine learning model comprises:
generating at least one receiver operating characteristic curve.

19. The apparatus of claim 14, wherein the at least one processing device is further configured:
to remove one or more constraints from the at least one machine learning model using at least one Lagrangian function.

20. The apparatus of claim 18, wherein training the at least one machine learning model further comprises:
processing at least a portion of data points in at least one area under the at least one receiver operating characteristic curve using the at least one stochastic gradient descent technique.

* * * * *